(12) United States Patent
Finke et al.

(10) Patent No.: US 12,534,217 B2
(45) Date of Patent: Jan. 27, 2026

(54) DISCONNECT MECHANISMS

(71) Applicant: Hamilton Sundstrand Corporation, Charlotte, NC (US)

(72) Inventors: Aaron M. Finke, Janesville, WI (US); Gabriella Crisanti, Kensworth Dunstable (GB); Michael James Dawson, Bristol (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 90 days.

(21) Appl. No.: 18/470,896

(22) Filed: Sep. 20, 2023

(65) Prior Publication Data

US 2024/0101267 A1 Mar. 28, 2024

(30) Foreign Application Priority Data

Sep. 23, 2022 (EP) .................................. 22197567

(51) Int. Cl.
*B64D 35/025* (2025.01)

(52) U.S. Cl.
CPC ................................. *B64D 35/025* (2024.01)

(58) Field of Classification Search
CPC ...... F16D 11/14; F16D 11/04; F16D 2300/22; F16D 2023/123; F16D 23/12; B64D 35/025; F16F 15/16; F16F 15/0232; F16F 2222/126; F16F 2230/30; F16F 2232/08; F16F 2234/02
See application file for complete search history.

(56) References Cited

U.S. PATENT DOCUMENTS

| 12,215,693 B2* | 2/2025 | Russalian | B22F 5/10 |
| 2010/0013329 A1 | 1/2010 | Heidenreich et al. | |
| 2020/0328657 A1* | 10/2020 | Jung | H02K 11/21 |
| 2021/0033030 A1* | 2/2021 | Flower | F16D 25/082 |

(Continued)

FOREIGN PATENT DOCUMENTS

| DE | 19602119 C1 | 5/1997 |
| GB | 2572427 A | 10/2019 |
| WO | 2021181105 A1 | 9/2021 |

OTHER PUBLICATIONS

Abstract for DE19602119 (C1), Published: May 22, 1997, 1 page.
European Search Report for Application No. 22197567.5, mailed Mar. 23, 2023, 6 pages.

*Primary Examiner* — Farhana Pervin
(74) *Attorney, Agent, or Firm* — CANTOR COLBURN LLP (57) ABSTRACT

A drive mechanism for use with an electric motor and a clutch mechanism The drive mechanism comprises a rotor shaft, a disconnect shaft, a disconnect mechanism, at least one damper element, a part of the clutch, and a lubrication system. The rotor shaft and disconnect shaft have a longitudinal axis A. The disconnect shaft transmits torque between the rotor shaft and the clutch mechanism. The disconnect shaft comprises the part of the clutch and a shaft element. The disconnect mechanism is configured to move the disconnect shaft between an engaged position in which the part of the clutch is engaged with the clutch mechanism and a disengaged position in which the part of the clutch is not engaged with the clutch mechanism. The at least one damper element is configured to absorb at least part of any kinetic energy introduced into the disconnect shaft.

14 Claims, 7 Drawing Sheets

(56) References Cited

U.S. PATENT DOCUMENTS

| | | |
|---|---|---|
| 2021/0119511 A1 | 4/2021 | Bloor |
| 2021/0394600 A1 | 12/2021 | Absenger et al. |
| 2022/0329181 A1* | 10/2022 | Allias .................. B64D 27/355 |
| 2023/0021085 A1* | 1/2023 | Allias .................... B64D 27/34 |

* cited by examiner

DISCONNECT MECHANISMS

CROSS REFERENCE TO RELATED APPLICATIONS

This application claims priority to European Patent Application No. 22197567.5 filed Sep. 23, 2022, the entire contents of which is incorporated herein by reference.

FIELD OF THE INVENTION

This disclosure relates to disconnect mechanisms and, in particular, disconnect mechanisms for use in aircraft propulsion systems that include an internal combustion engine and an electrical motor that supply torque to the same gearbox.

SUMMARY

According to a first aspect of the present disclosure there is provided a drive mechanism for use with a rotating machine and a clutch mechanism, in which the drive mechanism comprises a rotor shaft, a disconnect shaft, a disconnect mechanism, at least one damper element, a part of a clutch and a lubrication system. The rotor shaft and disconnect shaft have a longitudinal axis A. The disconnect shaft transmits torque between the rotor shaft and the clutch mechanism. The disconnect shaft comprises the part of the clutch and a shaft element, and the disconnect mechanism is configured to move the disconnect shaft between an engaged position in which the part of the clutch is engaged with the clutch mechanism and a disengaged position in which the part of the clutch is not engaged with the clutch mechanism. The at least one damper element is configured to absorb at least part of any kinetic energy introduced into the disconnect shaft as a result of the movement of the disconnect shaft from the engaged position to the disengaged position. The lubrication system comprises at least one lubricant input, at least one lubricant output, and at least one lubricant pathway. At least one lubricant pathway extends between and permits the flow of lubricant between one of the at least one lubricant inputs and one of the at least one lubricant outputs.

In an embodiment of the above embodiment, the lubrication system also functions as a cooling system. In some embodiments the lubrication system is configured for use with a suitable oil.

In an embodiment of any of the above embodiments, at least one lubricant input is a port, nozzle or similar to which a conduit, pipe or line may be reversibly or permanently attached, and through which the lubricant may flow from the conduit, pipe or line and into the drive mechanism.

In an embodiment of any of the above embodiments, at least one lubricant input is a conduit, pipe or line through which lubricant may flow that is fixed to the drive mechanism.

In an embodiment of any of the above embodiments, the conduit, pipe or line may extend from a lubricant source to the drive mechanism. In some embodiments, the lubricant source is a sump or other holding tank for the lubricant.

In an embodiment of any of the above embodiments, the lubricant may pass through a heat exchanger when flowing from the lubricant source to the drive mechanism. In some embodiments the heat exchanger is configured to absorb heat from the lubricant and subsequently transfer that heat into the environment. A non-limiting example of a heat exchanger is a radiator.

In an embodiment of any of the above embodiments, at least one lubricant output is a port, nozzle or similar to which a conduit, pipe or line may be reversibly or permanently attached, and through which the lubricant may flow from the drive mechanism and into the conduit, pipe or line.

In an embodiment of any of the above embodiments, at least one lubricant output is a conduit, pipe or line through which lubricant may flow that is fixed to the drive mechanism.

In an embodiment of any of the above embodiments, at least one lubricant output may include a seal, bearing or joint through which the lubricant may flow or seep, a means for collecting the lubricant once it has exited the seal, bearing or joint, and a means for introducing the collected lubricant into a conduit, pipe or line.

In an embodiment of any of the above embodiments, the conduit, pipe or line may extend from the drive mechanism to a lubricant source. In some embodiments, the lubricant source is a sump or other holding tank for the lubricant.

In an embodiment of any of the above embodiments, the lubricant may pass through a heat exchanger when flowing from the drive mechanism to the lubricant source. In some embodiments the heat exchanger is configured to absorb heat from the lubricant and subsequently transfer that heat into the environment. A non-example of a heat exchanger is a radiator.

In an embodiment of any of the above embodiments, at least one lubricant pathway comprises one lubricant input and two or more lubricant outputs.

In an embodiment of any of the above embodiments, the disconnect shaft and the first part of the clutch are separate elements that are joined to each other so that the disconnect shaft and the part of the clutch are effectively a single unit.

In an alternative embodiment of the above embodiment, the disconnect shaft and the part of a clutch are integral on a single unit.

Unless otherwise stated or the context requires otherwise, use of disconnect shaft herein is to be understood to reference the disconnect shaft alone when part of the disconnect shaft forms a first part of the clutch mechanism or the disconnect shaft and first part of the clutch.

When the drive mechanism of the present disclosure is in use and the disconnect shaft is in the engaged position, the disconnect shaft rotates around the longitudinal axis A and torque is transmitted between the rotating machine and the clutch mechanism via the rotor shaft and the disconnect shaft. When it is desired to decouple the rotating machine from the clutch mechanism the disconnect mechanism is activated and the disconnect shaft is moved to the disengaged position. This occurs whilst the rotor shaft and disconnect shaft are both rotating about the longitudinal axis A. The activation of the disconnect mechanism combined with the release of frictional forces within the clutch mechanism that occurs as the disconnect shaft is disconnected from the clutch mechanism can have, in combination, the result that the translational kinetic energy (movement in an axial direction away from the clutch mechanism) is introduced into the disconnect shaft as it is moved to the disengaged position. For example, it has been found that when a dog clutch is rotating at around 12,000 rpm (around 1257 rad/s) the disconnect shaft is propelled away from the other part of the dog clutch at a speed of around 100 inches per second (around 2.54 m/s).

An advantage of the drive mechanism of the present disclosure is that the at least one damper element will absorb and dissipate the translational kinetic energy introduced to the disconnect shaft. This minimises the risk of damage to the disconnect shaft or other elements of the drive mechanism as a result of that translational kinetic energy.

In an embodiment of any of the above embodiments, the rotor shaft comprises an axially extending void, the rotor shaft and disconnect shaft are co-axial, the disconnect shaft is at least partially positioned within the void, and the movement of the disconnect shaft between the engaged position and disengaged position is in an axial direction. The rotor shaft and disconnect shaft are so configured that torque may be transmitted between the rotor shaft and disconnect shaft, and the configuration allows transmission of torque throughout the axial movement of the disconnect shaft. The disconnect shaft defines a longitudinally extending lubricant conduit, and one end of the lubricant conduit defines a lubricant input and at least one lubricant pathway includes the lubricant conduit.

In an embodiment of any of the above embodiments, the lubricant conduit in the disconnect shaft extends to one or more apertures through the disconnect shaft. Those apertures are so located that each aperture mouths into a space, passage, or drive mechanism or electric motor component into which lubricant may flow.

In an embodiment of any of the above embodiments the space or passage may be in fluid communication with the clutch mechanism, and the lubricant output is so configured that lubricant can flow out of the drive mechanism and into the clutch mechanism. This will maintain lubrication of the clutch mechanism. Once the lubricant has flowed through the clutch mechanism the lubricant may be returned to the lubricant source via a conduit, pipe or line.

In an embodiment of any of the above embodiments, the drive mechanism is supported within the electric motor by one or more, for example two, bearings, for example annular bearings. In such an embodiment a space or passage into which lubricant may flow from the lubricant conduit is in fluid communication with at least one bearing and the lubricant output is so configured that lubricant can flow out of the drive mechanism and into the at least one bearing. This will maintain lubrication of the at least one bearing. Once the lubricant has flowed through the at least one bearing the lubricant may be returned to the lubricant source via a conduit, pipe or line.

In an embodiment of any of the above embodiments, one of the rotor shaft and the disconnect shaft comprises one or more male splines, and the other of the rotor shaft and the disconnect shaft comprises one or more female splines. The male and female splines are configured to mesh with each other, and the torque may be transmitted between the rotor shaft and disconnect shaft through the male and female splines, and the male and female splines are in a lubricant pathway. In some embodiments, that lubricant pathway includes a space or passage into which lubricant may flow from the lubricant conduit. Once the lubricant has flowed past or through the male and female splines the lubricant flows out of the drive mechanism through a lubricant output. The lubricant is then returned to the lubricant source via a conduit, pipe or line In an embodiment of any of the above embodiments, the axially extending void within the rotor shaft has a substantially circular cross section in a plane perpendicular to the longitudinal axis A, and at least the portion of the disconnect shaft that is typically within the axially extending void also has a substantially circular cross section in a plane perpendicular to the longitudinal axis A.

In an alternative embodiment of any of the above embodiments, the axially extending void within the rotor shaft has a non-circular cross section in a plane perpendicular to the longitudinal axis A, and at least the portion of the disconnect shaft that is typically within the axially extending void also has the same non-circular cross section as the axially extending void in a plane perpendicular to the longitudinal axis A. In some embodiments that non-circular cross section is a hexagonal or other polygonal cross section and the disconnect shaft has the same cross section. In such embodiments interlocking of the rotor shaft and the disconnect shaft causes transmission of torque between the rotor shaft and the disconnect shaft.

In an embodiment of any of the above embodiments, the drive mechanism further comprises a first chamber and the first chamber is defined by the rotor shaft, the disconnect shaft, and one or more first seal elements. Each first seal element is a dynamic seal and extends between the rotor shaft and the disconnect shaft, each first seal element makes, creates, or forms a fluid tight seal between the rotor shaft and disconnect shaft, and the first chamber forms no part of any lubricant pathway. The first chamber is sealed off from and is not part of any lubrication pathway because the first chamber needs to be full of a compressible fluid, that is a gas, for the reasons discussed below.

The or each dynamic seal is configured to allow the disconnect shaft to move at least a predetermined distance in an axial direction relative to the rotor shaft.

In an embodiment of any of the above embodiments, there are two first seal elements, the first seal elements are axially spaced from each other, and the first chamber is axially between the first seal elements.

In an embodiment of any of the above embodiments, the first chamber has an axial first end and an axial second end, the first end is further from the clutch mechanism than the second end, each end of the first chamber is at least partially formed by a first seal element, and the cross-sectional area of the axially extending void adjacent the first seal element of the first end is smaller than the cross-sectional area of the axially extending void adjacent the first seal element of the second end.

In an embodiment of any of the above embodiments, the rotor shaft and disconnect shaft are so configured that movement of the disconnect shaft between the engaged position and disengaged position causes the volume of the first chamber to decrease.

In an embodiment of any of the above embodiments, the first chamber may comprise a first, second and third zone, the first zone extends from the first end towards the second end to a first intermediate position, the faces of the rotor shaft and disconnect shaft defining the first zone are parallel with each other and the axis A, the third zone extends from the second end towards the first end to a second intermediate position, the faces of the rotor shaft and disconnect shaft defining the third zone are parallel with each other and the axis A, the second zone extends between the first and second intermediate positions, and the first intermediate position is closer to the first end than the second intermediate position. In this embodiment the cross sectional area of the first zone is smaller than the cross sectional area of the third zone, both cross sections being in a plane perpendicular to the axis A. In this embodiment, when the portion of the disconnect shaft in the third zone moves towards the first zone the volume of the first chamber decreases because the portion of the disconnect shaft in the third zone sweeps through a greater volume than the portion of the disconnect shaft in the first zone and the overall volume of the first chamber thus decreases by the difference between the volumes swept through by those portions.

In an embodiment of any of the above embodiments, the drive mechanism further comprises a biasing means, and the biasing means is configured to bias the disconnect shaft toward the engaged position.

In an embodiment of any of the above embodiments, the biasing means comprises a spring. In some embodiments the spring is a compression spring, in some embodiments a helical compression spring or a wave compression spring. In some alternative embodiments the spring is a tension spring, in some embodiments a helical tension spring.

In an embodiment of any of the above embodiments, the biasing means is located within the axially extending void, and the biasing means extends between the rotor shaft and the disconnect shaft. In some embodiments one or both of the rotor shaft and the disconnect shaft includes a stop element with which the biasing element interacts.

In an embodiment of any of the above embodiments, the damper element comprises one or more of the first chamber, each first seal element, and the biasing means.

The first chamber acts to absorb the translational kinetic energy in the following fashion: The movement of the disconnect shaft causes the first chamber to reduce in volume and, as a result, the pressure of the gas in the first chamber increases. With continued movement of the disconnect shaft the first chamber becomes increasingly resistant to a further decrease in volume the translational kinetic energy converts to heat in the gas and increased gas pressure.

The first seal elements absorb translational kinetic energy as a result of friction between them and one or both of the rotor shaft and/or the disconnect shaft.

The biasing means absorbs translational energy by deforming and thus absorbing translational energy.

In an embodiment of any of the above embodiments, the clutch mechanism is a dog clutch, the dog clutch comprises first and second rotating components that interlock to couple with each other, the part of a clutch is one of the first and second rotating components, and the first and second rotating components are in a lubricant pathway.

According to a second aspect of the present disclosure there is provided an electric motor comprising a casing, a stator, an armature, and a drive mechanism according to the first aspect of the present disclosure. The stator is fixed to the casing, and the armature is fixed to the rotor shaft.

In an embodiment of any of the above embodiments, the electric motor further comprises a lubrication system. The lubrication system comprises at least one lubricant input, at least one lubricant output, and at least one lubricant pathway, and at least one lubricant pathway extends between and permits the flow of lubricant between one of the at least one lubricant inputs and one of the at least one lubricant outputs.

In an embodiment of the above embodiment, the lubrication system also functions as a cooling system. In some embodiments the lubrication system is configured for use with a suitable oil.

In an embodiment of any of the above embodiments, at least one lubricant input is a port, nozzle or similar to which a conduit, pipe or line may be reversibly or permanently attached, and through which the lubricant may flow from the conduit, pipe or line and into the electric motor.

In an embodiment of any of the above embodiments, at least one lubricant input is a conduit, pipe or line through which lubricant may flow that is fixed to the electric motor.

In an embodiment of any of the above embodiments, the conduit, pipe or line may extend from a lubricant source to the electric motor. In some embodiments, the lubricant source is a sump or other holding tank for the lubricant.

In an embodiment of any of the above embodiments the lubricant source for the electric motor is the same as the lubricant source for the drive mechanism.

In an embodiment of any of the above embodiments, the lubricant may pass through a heat exchanger when flowing from the lubricant source to the electric motor. In some embodiments the heat exchanger is configured to absorb heat from the lubricant and subsequently transfer that heat into the environment. A non-limiting example of a heat exchanger is a radiator.

In an embodiment of any of the above embodiments, at least one lubricant output is a port, nozzle or similar to which a conduit, pipe or line may be reversibly or permanently attached, and through which the lubricant may flow from the electric motor and into the conduit, pipe or line.

In an embodiment of any of the above embodiments, at least one lubricant output is a conduit, pipe or line through which lubricant may flow that is fixed to the electric motor.

In an embodiment of any of the above embodiments, at least one lubricant output may include a seal, bearing or joint through which the lubricant may flow or seep, a means for collecting the lubricant once it has exited the seal, bearing or joint, and a means for introducing the collected lubricant into a conduit, pipe or line.

In an embodiment of any of the above embodiments, the conduit, pipe or line may extend from the drive mechanism to a lubricant source. In some embodiments, the lubricant source is a sump or other holding tank for the lubricant.

In an embodiment of any of the above embodiments, the lubricant may pass through a heat exchanger when flowing from the electric motor to the lubricant source. In some embodiments the heat exchanger is configured to absorb heat from the lubricant and subsequently transfer that heat into the environment. A non-limiting example of a heat exchanger is a radiator.

In an embodiment of any of the above embodiments, at least one lubricant pathway comprises one lubricant input and two or more lubricant outputs.

In an embodiment of any of the above embodiments the stator is in one or more lubricant pathway.

In an embodiment of any of the above embodiments the electric motor further comprises a second chamber. The second chamber is defined by the rotor shaft, a part of the casing, and one or more one second seal elements. Each second seal element extends between the rotor shaft and the casing, and each second seal element makes a fluid tight seal between the rotor shaft and the casing. The armature is located in the second chamber, and the second chamber forms no part of any lubricant pathway. The location of the armature in a chamber that is not part of a lubricant pathway and thus does not include lubricant is advantageous because the presence of lubricant would increase resistance to the rotation of the rotor shaft and decrease the efficiency of the electric motor.

According to a third aspect of the present disclosure there is provided an aircraft propulsion system comprising an electric motor according to the second aspect of the present disclosure, an internal combustion engine, a gearbox, a propeller drive shaft and a propeller in which the electric motor and internal combustion engine both supply torque to the gearbox.

According to a fourth aspect of the present disclosure there is provided an aircraft comprising at least one aircraft propulsion system according to the third aspect of the present disclosure.

BRIEF DESCRIPTION OF THE DRAWINGS

The present disclosure will be further described and explained by way of example with reference to the accompanying drawings in which.

DETAILED DESCRIPTION

Figure 1:
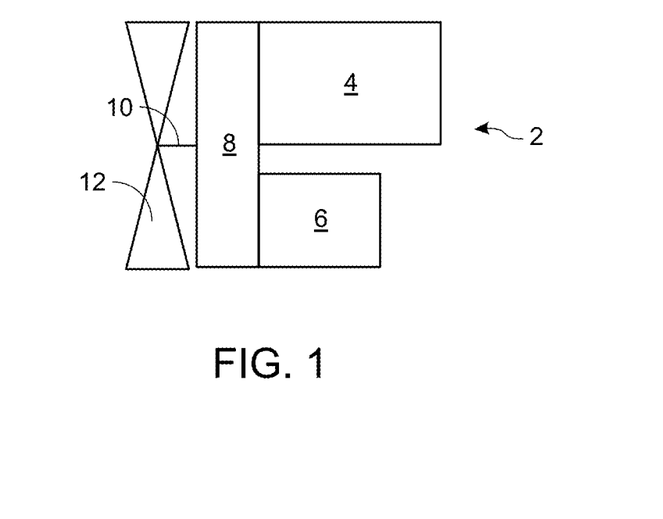
FIG. 1 shows a schematic embodiment of an aircraft propulsion system according to the present disclosure.

With reference to FIG. 1, an aircraft propulsion system 2 includes an internal combustion engine 4 and an electric motor 6. The internal combustion engine 4 and electric motor 6 are both coupled to a gearbox 8 via an internal combustion engine drive shaft (not shown) and an electric motor drive shaft 96 (shown in FIGS. 2 and 3) respectively, and configured to input torque or rotational motion into the gearbox 8 via those drive shafts. The gearbox 8 outputs torque/rotational motion to a propeller 12 via a propeller shaft 10.

In use, it is sometimes desirable, for example at takeoff, that the aircraft propulsion system 2 is configured so that the internal combustion engine 4 and electric motor 6 are both coupled to and supplying torque/rotational motion to the gearbox 8 and thus to the propeller 12 via the propeller shaft 10. At other times, for example when the aircraft is cruising, torque/rotational motion from the electric motor 6 is not required.

When torque/rotational motion from the electric motor 6 is not required, it may be desirable that the electric motor is disengaged or decoupled from the gearbox 8 so as to minimise wear on the components of the electric motor 6, and to maximise the efficiency of the propulsion system 2. The efficiency of propulsion system 2 is maximised by disengaging the electric motor 6 from the gearbox 8 because continued coupling of the electric motor 6 to the gearbox 8 when the electric motor 6 is not being powered by an electrical power source forces rotation of the electric motor 6 which is powered by the internal combustion engine 4 and causes the electric motor 6 to act as an electrical generator.

It is frequently the case that disengagement of the gearbox 8 from the electric motor 6 has to take place whilst the internal combustion engine 4 is driving the gearbox 8 and, as a result, whilst the drive shaft 96 between the gearbox 8 and the electric motor 6 is rotating at high speeds, for example at around 12,000 rpm (around 1257 rad/s).

Figure 2:
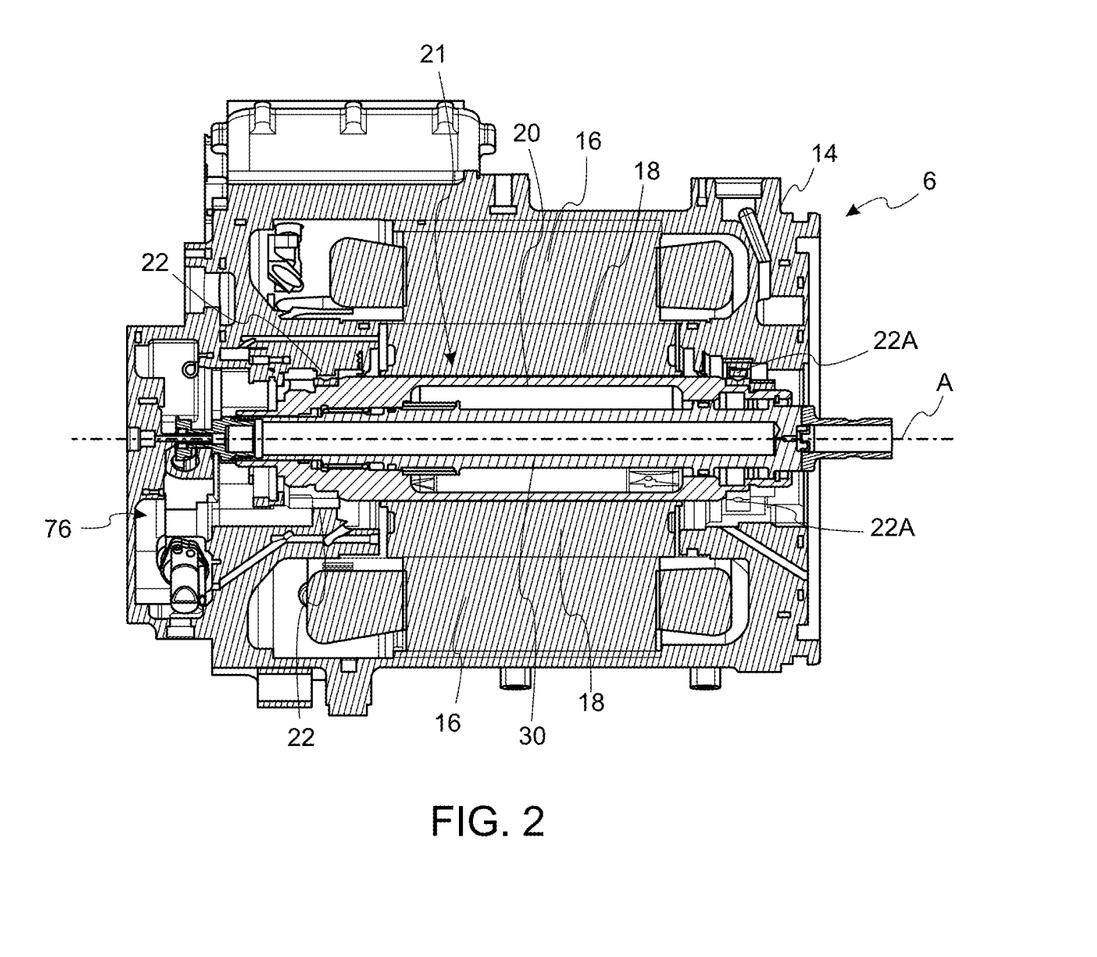
FIG. 2 shows a schematic embodiment of an electric motor according to the present disclosure when the electric motor is engaged with the gearbox of the aircraft propulsion system of FIG. 1.

With reference to FIG. 2, the electric motor 6 includes a housing 14 within which are located a stator 16 which is fixed to the housing 14, an armature 18 which is mounted on a rotor shaft 20, and a drive mechanism 21. The drive mechanism 21 includes the rotor shaft 20 and a disconnect shaft 30.

The rotor shaft 20 is supported in the housing 14 via rotary bearings 22, 22A. The rotary bearings 22, 22A allow the rotor shaft 20 to rotate around the rotor shaft's longitudinal axis A. Operation of the electric motor 6 causes the armature to rotate within the space defined by the stator 16 and as a result the rotor shaft 20 to rotate around axis A.

With reference to FIGS. 2 to 7, the rotor shaft 20 has first and second ends 32, 34, an outer surface 24 and includes an axially extending or inner void 26 which is defined by an inner surface 28.

The armature 18 is fixed to the outer surface 24 of the rotor shaft 20.

The inner void 26 extends the length of the rotor shaft 20 and extends between a first mouth 46 at the first end 32 of the rotor shaft, and a second mouth 48 at the second end 34 of the rotor shaft. The inner surface 28 defining the inner void 26 has, at any axial position along the rotor shaft 20 a circular or substantially circular cross section in the plane perpendicular to axis A.

Extending along and through most of the inner void 26 is a disconnect shaft 30 with a central axis common with that of the rotor shaft 20. The disconnect shaft 30 has first and second disconnect shaft ends 50, 52 which are close to the first and second mouths 46, 48 of the rotor shaft 20 respectively. The first disconnect shaft end 50 is a located a short distance into the inner void 26 from the first mouth 46, and the second disconnect shaft end 52 extends out of the second mouth 48 of the rotor shaft 20. At least a portion, and in some embodiments at least most of the length of the disconnect shaft 30 has a circular cross section in the plane perpendicular to the axis A.

The inner void 26 is formed of first, second and third zones 54, 56, 58 which each extend in the axial direction. The first, second and third zones 54, 56, 58 may be referred to as first, second and third axial zones.

At least a portion, and in some embodiments substantially all, of the first axial zone 54 of the inner void 26 has cross section of diameter D1. The diameter D1 and the outside diameter of the portion of the disconnect shaft 30 that sits within or is adjacent the first axial zone 54 are such that the disconnect shaft 30 is a sliding or loose fit within the inner surface 28 of the rotor shaft 20.

At least a portion, and in some embodiments substantially all, of the second axial zone 56 of the inner void 26 has a cross section of diameter D2. The diameter D2 and the outside diameter of the portion of the disconnect shaft 30 that sits within the second axial zone 56 are such that there is a first chamber 60 formed between and largely defined by the outer surface 62 of that portion of the disconnect shaft 30 and the inner surface 28 of the rotor shaft 20.

At least a portion, and in some embodiments substantially all, of the third axial zone 58 of the inner void 26 has a cross section of diameter D3. The diameter D3 and the outside diameter of the portion of the disconnect shaft 30 that sits within or is adjacent the third axial zone 58 are such that the disconnect shaft 30 is a sliding or loose fit within the inner surface 28 of the rotor shaft 20.

The diameter D1 is smaller than the diameter D3 which is smaller than the diameter D2. For example, the diameter D1 may be 30 mm, diameter D3 may be 35 mm, and diameter D2 may be 50 mm. Diameters D1, D2 and D3 may be of other dimensions with D1<D3<D2 in other embodiments.

Within the first axial zone 54 an axially extending portion of the inner surface 28 of the rotor shaft 20 is configured to form a plurality of parallel axially extending female spline teeth that extend into the inner void 26. The spline teeth are circumferentially and evenly spaced around the inner surface 28.

Also within the first axial zone 54 an axially extending portion of the outer surface 62 of the disconnect shaft 30 is configured to form a plurality of parallel axially extending grooves or male spline teeth that extend from the disconnect shaft 30. The grooves are circumferentially and evenly spaced around the outer surface 62.

The male and female spline teeth, which may be collectively termed the spline 42, are configured to mesh or engage with each other to allow the transmission of torque/rotational motion between the rotor shaft 20 and the disconnect shaft 30.

The spline 42 is so configured that one of the male and female spline teeth can move at least a predetermined distance D4 in an axial direction relative to the other of the male and female spline teeth and remain meshed or engaged with each other.

In other non-illustrated embodiments of the present disclosure other configurations of the male and female spline teeth may be used. For example, the female spline teeth may be in the rotor shaft 20 and the male spline teeth on the disconnect shaft 30.

Further located in the first axial zone 54 is a first seal element 64 which extends between the inner surface 28 or the rotor shaft 20 and the outer surface 62 of the disconnect shaft 30. The first seal element 64 is dynamic seal suitable for allowing relative axial movement between the rotor shaft 20 and the disconnect shaft 30. The first seal element 64 is configured to prevent the passage of fluid, for example lubricant, typically oil, or gas, typically atmosphere, past the seal.

Located in the third axial zone 58 is a first seal element 66 which extends between the inner surface 28 or the rotor shaft 20 and the outer surface 62 of the disconnect shaft 30. The first seal element 66 is dynamic seal suitable for allowing relative axial movement between the rotor shaft 20 and the disconnect shaft 30. The first seal element 66 is adapted to prevent the passage of fluid, for example lubricant, typically oil, or gas, typically atmosphere, past the seal.

One or both of the first seal elements 64, 66 may be located in a groove in one of the inner surface 28 of the rotor shaft 20 or the outer surface 62 of the disconnect shaft 30 in the first and third axial zones 54, 58 respectively. The other of the inner surface 28 of the rotor shaft 20 and the outer surface 62 of the disconnect shaft 30 is smooth to allow the axial movement of the inner surface 28 of the rotor shaft 20 and the outer surface 62 of the disconnect shaft 30 relative to each other without causing damage to the first seal elements 64, 66.

The effect of the first seal elements 64, 66 is that the first chamber 60 is hermetically sealed. That sealing and the different diameters D1 and D3 of the inner void 26 and the disconnect shaft 30 in the first and third axial zones 54, 58 has the effect that any axial movement of the disconnect shaft 30 relative to the rotor shaft 20 causes the volume of the first chamber 60 to change and as a result the pressure of the gas, typically atmospheric gas, within the first chamber 60 to increase or decrease. Specifically, because diameter D1 is smaller than diameter D3, when the disconnect shaft moves in the direction 44 the volume of first chamber 60 gets larger, and when the disconnect shaft moves in the direction opposite to direction 44 the volume of first chamber 60 gets smaller. The pressure of the gas in first chamber 60 accordingly decreases and increases respectively.

A further effect of the first seals 64, 66 is that oil or other lubricant is prevented from entering the first chamber 60.

The portion of the disconnect shaft 30 that constantly remains within the second axial zone 56 supports a first stop element 68. The first stop element 68 is so configured that it engages with a first end of a reset spring 70. The reset spring 70 extends between the first stop element 68 on the disconnect shaft 30 and a second stop element 72 on the rotor shaft 20.

The reset spring 70 is, in the illustrated embodiment of the present disclosure, a compression spring. The reset spring 70 is configured to bias the first and second stop elements 68, 72 away from each other, and as a result, to bias the disconnect shaft 30 in the direction 44 (the direction extending from the first mouth 46 to the second mouth 48 of the rotor shaft 20).

In other, non-illustrated embodiments of the present disclosure, the reset spring is a tension spring and the first and second stop elements are so located that the reset spring is configured to bias the first and second stop elements towards each other, and as a result, to bias the disconnect shaft in the direction 44.

The first end 50 of the disconnect shaft 30 is engaged with a disconnect mechanism 76.

Figure 4:
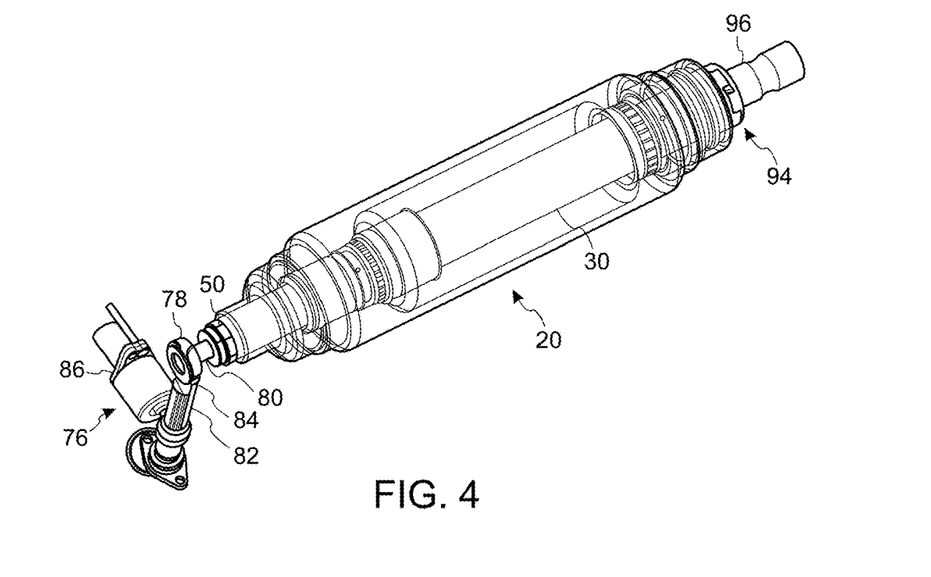
FIG. 4 shows a schematic perspective view of the drive mechanism of the electric motor of FIG. 2 when the electric motor is engaged with the gearbox of the aircraft propulsion system of FIG. 1.
Figure 5:
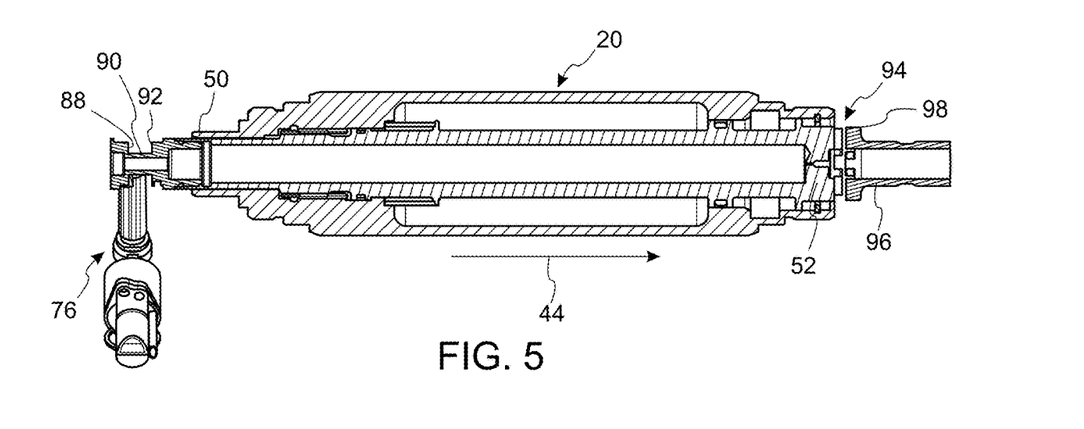
FIG. 5 shows a schematic and partially sectioned view of an embodiment of a drive mechanism of the electric motor of FIG. 2 when the electric motor is disengaged from the gearbox of the aircraft propulsion system of FIG. 1.
Figure 7:
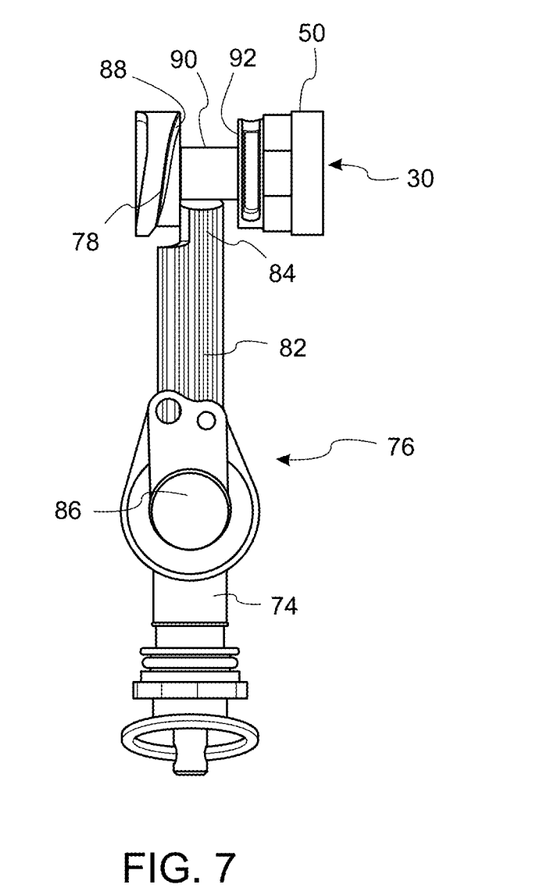
FIG. 7 shows an enlarged detail of FIG. 3.

As may best be seen in FIGS. 4, 5 and 7, the disconnect mechanism 76 includes an end shaft 78 which is attached to the end 50 of the disconnect shaft 30 by an appropriate attachment means. The end shaft 78 is co-axial with the disconnect shaft 30.

The end shaft 78 defines a circumferential disconnect groove 80 which is defined by an actuation face 88, a groove base 90, and a passive face 92. The groove base 90 extends axially between the actuation face 88 and passive face 92. The actuation face 88 is further from the disconnect shaft 30 than the passive face 92.

The disconnect mechanism 76 further includes an actuation shaft 82 which has an actuation end 84. The actuation shaft 82 has a longitudinal axis and may be caused to translate towards the end shaft 78 by an actuator 86 and a biasing element 74. Biasing element 74 is typically a spring. The actuation end 84 and disconnect groove 80 are so configured that the actuation end 84 does not extend into the disconnect groove 80 during normal operation. That predetermined position may be termed the inactive position.

The actuation end 84 and disconnect groove 80 are further so configured that when the actuation shaft 82 is translated out of the inactive position the actuation end 84 engages the actuation face 88 of the groove 80 and impels/moves the end shaft 78, and as a result disconnect shaft 30, in the opposite direction to direction 44. The movement of the end shaft 78 and disconnect shaft 30 in the opposite direction to direction 44 is movement of more than distance D4 (shown in FIG. 6 and discussed below).

Figure 6:
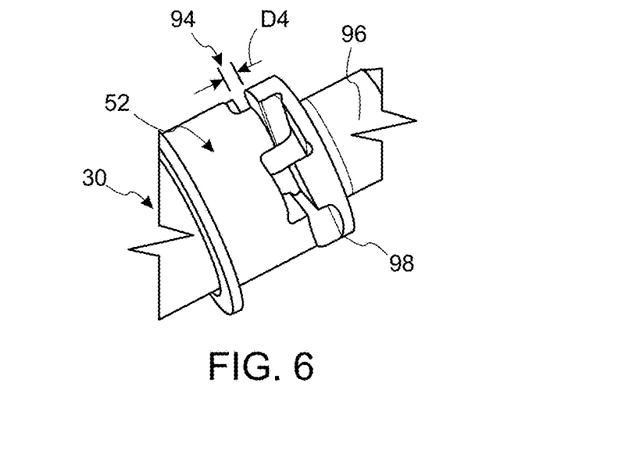
FIG. 6 shows an enlarged perspective detail of FIG. 5.

With reference to FIG. 6, the second end 52 of the disconnect shaft 30 is configured as one half or one of the rotating components of a dog clutch 94. The other half or rotating component of the dog clutch 94 is formed by an end 98 of a drive shaft 96 that is connected to the gearbox 8. The dog clutch 94 is so configured that separation of the halves of the dog clutch 94 in the axial direction by a distance greater than D4 causes the axially extending teeth of the dog clutch 94 to disengage from each other.

The disengagement between the gearbox 8 and the electric motor 6 occurs when the teeth on the two halves of the dog clutch 94 cease to be engaged with each other.

The functioning of the drive mechanism 21 the present disclosure is described by example as follows:

Before the propulsion system 2 of the aircraft is activated a user of the aircraft or an automated engine management system will ensure that the actuator shaft 82 of the disconnect mechanism 76 is in the inactive position, As a result (i) the shaft end 84 of the actuator shaft 82 is not in contact with the actuation face 88 of the disconnect groove 80; (ii) the reset spring 70 biases the disconnect shaft 30 in direction 44; and (iii) the teeth of the two halves of the dog clutch 94 are engaged with each other.

Figure 3:
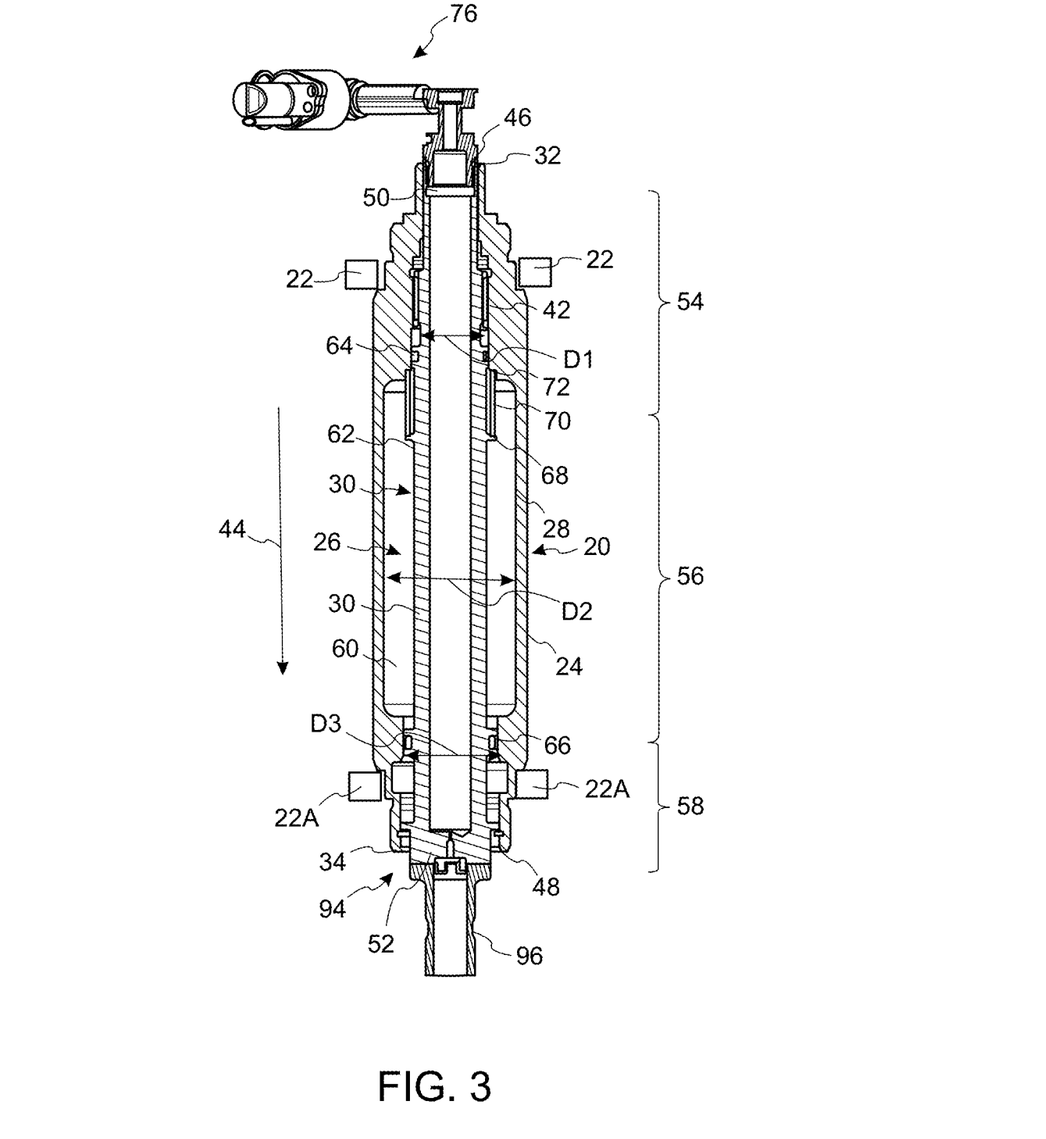
FIG. 3 shows a schematic and partially sectioned view of an embodiment of a drive mechanism of the electric motor of FIG. 2 when the electric motor is engaged with the gearbox of the aircraft propulsion system of FIG. 1.

Activation of the electric motor 6 by supply of electric current to one or both of the stator 16 and armature 18 causes the armature 18 and rotor shaft 20 to rotate about the axis A of the rotor shaft 20. The splines 42 between the rotor shaft 20 and disconnect shaft 30 cause the rotation of the rotor shaft 20 to be transmitted to the disconnect shaft 30, and the second end 52 of the disconnect shaft/one half of the dog clutch 94 to rotate. This drives the other half 98 of the dog clutch 94 and thus the drive shaft 96. Torque is thus transmitted from the electric motor 6 to the gearbox 8. This configuration is shown in FIGS. 2 to 4.

When it is desired that the electric motor 6 is no longer coupled to the gearbox 8, that is the electric motor 6 cannot transmit or receive torque/rotational motion to or from the gearbox 8, a user or engine management mechanism activates the actuator 86 of the disconnect mechanism 76. This causes the actuator shaft 82 to translate towards the end shaft 78 and the actuator shaft end 84 to contact the actuator face 88 of the disconnect groove 80. The contact of the actuator shaft end 84 with the actuation face 88 impels the end shaft 78 and disconnect shaft 30 in the direction opposite to direction 44. As a result, the second end 52 of the disconnect shaft 30/half of the dog clutch 94 moves away from the other half 98 of the dog clutch 94 by more than distance D4.

The activation of the disconnect mechanism 76 combined with the release of frictional forces within the dog clutch 94 that occurs as the disconnect shaft 30 is disconnected from the other half 98 of the dog clutch 94 can have, in combination, the result that the translational kinetic energy (movement in an axial direction away from the clutch mechanism) is introduced into the disconnect shaft 30 as it is moved to the disengaged position. For example, when the dog clutch mechanism 94 is rotating at around 12,000 rpm (around 1257 rad/s) the disconnect shaft 30 is propelled in the direction opposite to direction 44 at a speed of around 100 inches per second (around 2.54 m/s).

The movement of the disconnect shaft 30 that results from the separation of the dog clutch mechanism is slowed/the transitional kinetic energy is absorbed or dissipated by a combination of effects:

(i) The friction between the first and second seal elements 64, 66 and the outer surface 62 of the disconnect shaft 30 or the inner surface 28 of the rotor shaft 20;

(ii) The movement of the rotor shaft 20 in the direction opposite to the direction 44 causing the volume of the chamber 60 to decrease, the pressure of the gas held in the chamber to increase, and that pressure to resist further movement of the rotor shaft 20 in the direction opposite to the direction 44; and (iii) The movement of the rotor shaft 20 in the direction opposite to the direction 44 causing the reset spring 70 to be compressed or further compressed.

The slowing of the disconnect shaft/absorption or dissipation of the translational kinetic energy by the above effects is relatively gentle and avoids impacts and potentially damaging shockwaves from being propagated through the rotor shaft 20 and electric motor 6 as a whole.

The interaction of the shaft end 84 and actuation face 88 holds the disconnect shaft in a position where the halves 52, 98 of the dog clutch 94 are not engaged until it is desired to re-engage the electric motor 6 and gearbox 8.

When it is desired to re-engage the halves 52, 98 of the dog clutch 94 with each other, the actuator shaft 82 is retracted back to the inactive position. The reset spring 70 will at the same time push the disconnect shaft 30 and second end 52 of the disconnect shaft 30 into engagement with the other half 98 of the dog clutch 94.

Figure 8:
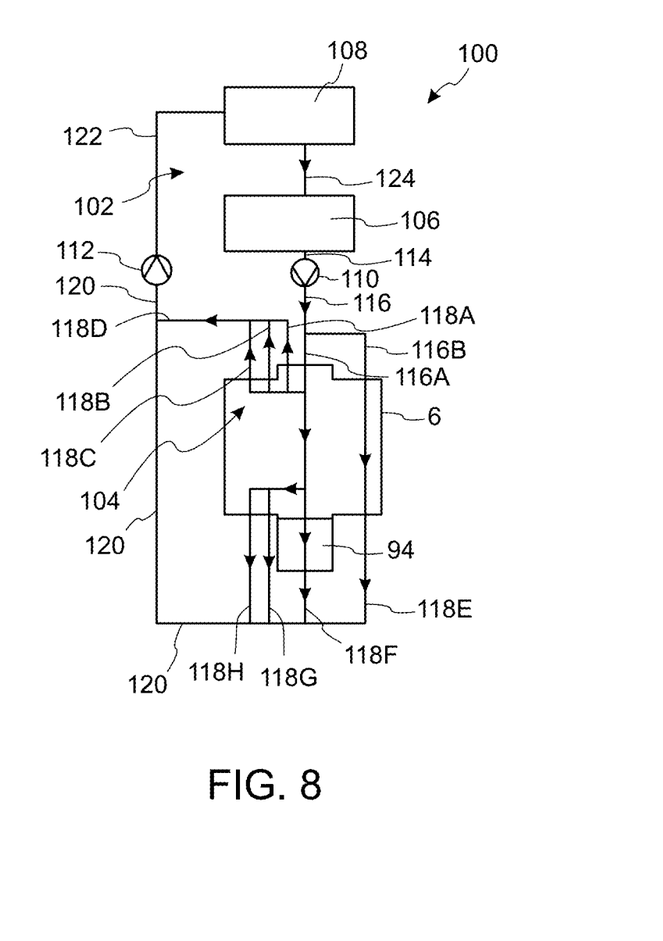
FIG. 8 shows a schematic view of an embodiment of a lubrication system for an electric motor and drive mechanism according to the present disclosure.

With reference to FIG. 8, A lubrication system 100 is comprised of a first system part 102 which is external to the electric motor 6, and a second part 104 which is internal to and connecting to the electric motor 6.

The first system part 102 of the lubrication system 100 includes a sump 106, a heat exchanger 108, a feed pump 110 and a return pump 112.

The lubrication system 100 is configured to operate in the following fashion:

The sump 106 is configured to hold a reservoir of lubricant (not shown). A feed line 114 extends from the sump 106 to the feed pump 110. The feed pump is configured to cause the flow of the lubricant from the pump 110 to the electric motor 6 along a feed line 116. The feed line 116 bifurcates to form feed lines 116A and 116B before the feed line reaches the electric motor 6.

It is to be understood that unless otherwise stated, all feed and return lines referenced herein create fluid communication between the elements of the lubrication system between which the line extends.

The feed lines 116A and 116B connect to first and second lubricant inputs 130, 132 respectively. The first and second lubricant inputs 130, 132 and the configuration of the second system part 104 will be described in greater detail in connection with FIGS. 9 and 10 below.

Once the lubricant has passed through the second system part 104, it leaves the second system part 104 through one of the lubricant outputs 134, 138, 154, 156, 168, 170, 192. Each of the system outputs 134, 138, 154, 156, 168, 170, 192 is connected to one of the return lines 118A to 118H. The return lines 118A to 118H are connected to a return line 120 which extends to the return pump 112. The return pump 112 draws the lubricant along the return lines 118A to 118H and 120 and pushes it into the heat exchanger 108 along return line 122.

The heat exchanger 108 a radiator and is configured to cause heat energy to be transferred from the lubricant and, via the heat exchanger 108, transfer that heat energy to the atmosphere.

Once the lubricant has passed through the heat exchanger 108 it is returned to the sump 106 via the return line 124.

Figure 9:
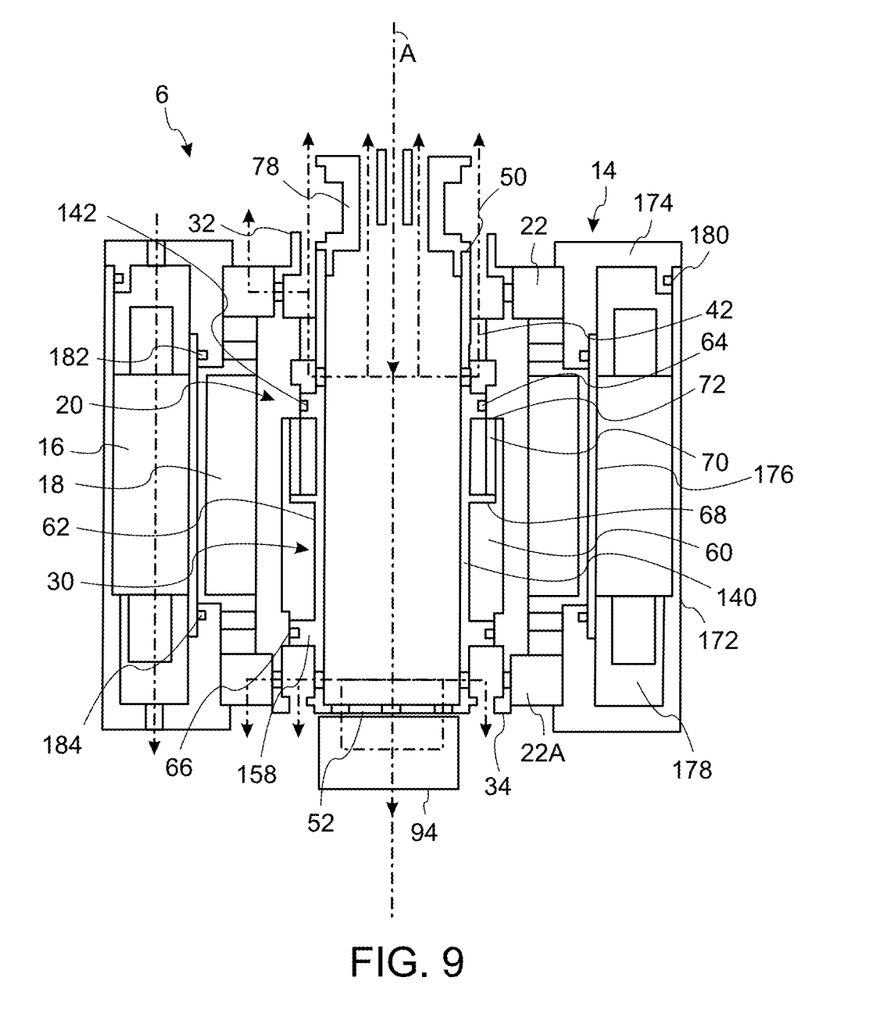
FIG. 9 shows a schematic sectional view of an embodiment of an electric motor and drive mechanism according to the present disclosure including a schematic representation of the lubrication pathways in the electric motor and drive mechanism with the elements of the drive mechanism and electric motor labelled.
Figure 10:
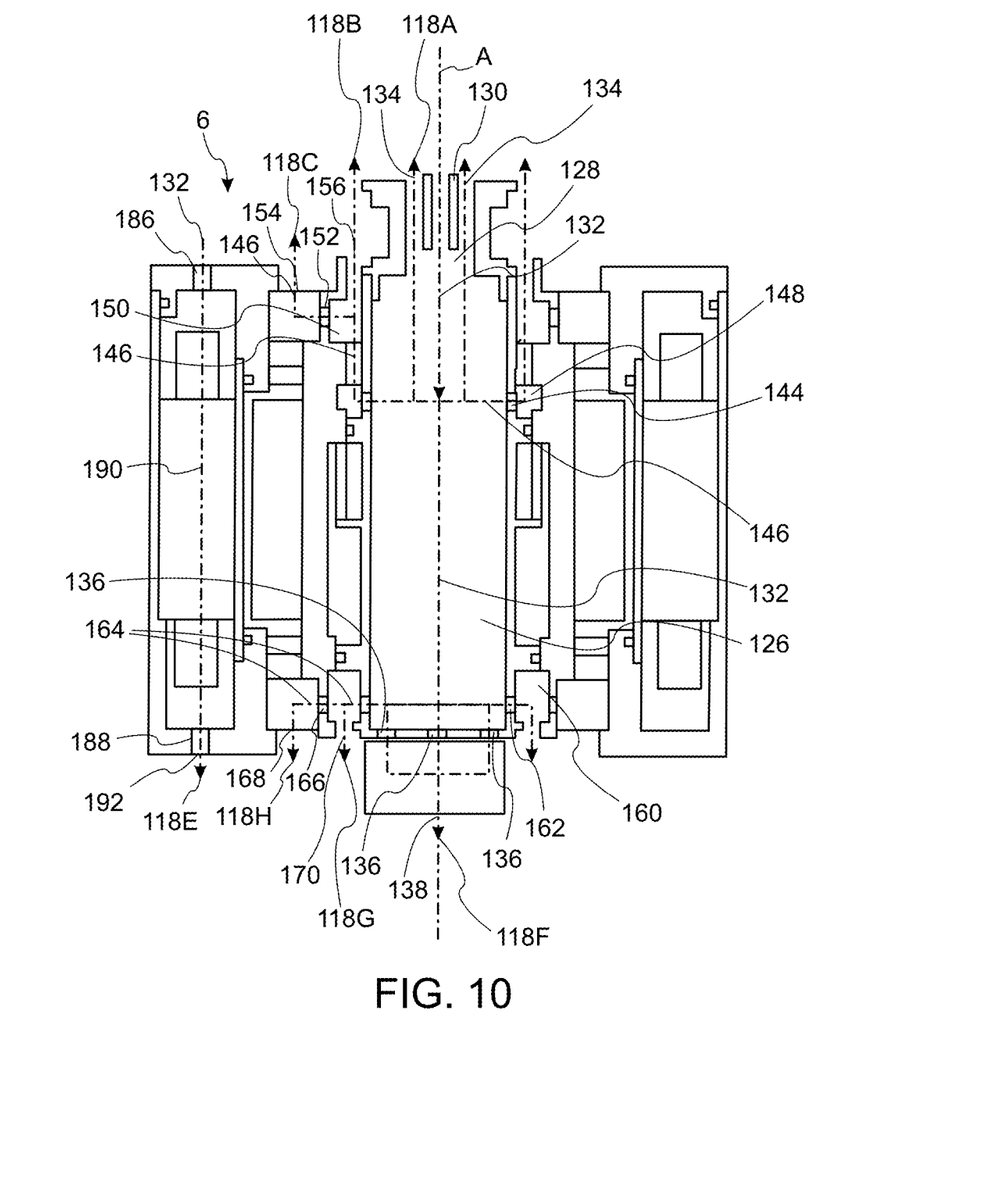
FIG. 10 shows a schematic sectional view of an embodiment of an electric motor and drive mechanism according to the present disclosure including a schematic representation of the lubrication pathways in the electric motor and drive mechanism with the elements of the lubrication pathways labelled.

With reference to FIGS. 9 and 10, a schematic section of an electric motor 6 is shown. The electric motor 6 is symmetrical in construction around the axis A and the various elements of the electric motor 6 as discussed and described with reference to FIGS. 2 to 7 have, for clarity, only been labelled on one side of the axis A, It is to be understood that as a result of the symmetrical nature of motor 6 each of the unlabelled elements on the other side of axis A to the labelled elements are the same element.

The disconnect shaft 30 includes an axially extending lubrication conduit 126 extending along the length of the disconnect shaft 30. The first end 50 of the disconnect shaft 30 is engaged with the end shaft 78. The end shaft 78 defines an end shaft conduit 128 into which a lubricant input 130 extends. A dynamic seal (not shown) extends between the first lubricant input 130 and the end shaft 78. The dynamic nature of the seal allows the first lubricant input 130 to be static in axial and rotational terms, and the end shaft 78 to rotate and move axially relative to the first lubricant input 130.

When the electric motor 6 is in use a flowpath 132 of lubricant flows from the first lubricant input 130 into the end shaft conduit 128, into and along lubrication conduit 126. The second end 52 of the disconnect shaft 30 defines one or more apertures 136 through which lubricant can exit the lubricant conduit 126 and flow, either directly or via one or more lines (not shown) into the dog clutch mechanism 94. The lubricant flows through at least part of the dog clutch mechanism 94 and out of that mechanism via a lubricant output 138. Lubricant output 138 is connected to return feedline 118F.

Any leakage of lubricant from the end shaft conduit 128 past the dynamic seal (not shown) between the first lubricant input 130 and the end shaft 78 is collected by a collection means, for example a drip tray (not shown), that forms a lubricant output 134. The lubricant output 134 is connected to the return feedline 118A.

The lubrication conduit 126 of the disconnect shaft 30 is partially defined by an axially extending shaft wall 140. On the radially outer surface of the shaft wall 140 is a first seal 64. In FIG. 9 the first seal 64 is shown as being located in a circumferential groove defined by a circumferential rib 142. In other non-illustrated embodiments the circumferential rib 142 is not present and the circumferential groove is in the outer surface 62 of the disconnect shaft 30.

The first seal 64 and circumferential rib 142 are axially located on the outer surface 62 of the disconnect shaft 30 in a position that allows the male or female part of the splines 42 that are part of or attached to the disconnect shaft 30 to be located between the first seal 64 and the first end 50 of the disconnect shaft 30. The shaft wall 140 defines at least one aperture 144, which is axially located between the first seal 64 and the splines 42. Lubricant flowing through the or each aperture 144 enters a space 148 between the rotor shaft 20 and disconnect shaft 30. One end of the space 148 is closed by the first seal 64 and circumferential rib 142. The flow of lubricant out of the or each aperture 144 and into the space 148 is part of a flowpath 146. The flowpath 146 then passes through the splines 42 and into a further space 150 which is adjacent the first end 32 of the rotor shaft and first end 50 of the disconnect shaft.

The rotor shaft 20 has the bearing 22 mounted on it adjacent the first end 32 of the rotor shaft and the bearing 22 is radially outwards from space 150. At least one aperture 152 passes through the rotor shaft 20 from the space 150 to the bearing 22 allowing lubricant flowing along the flowpath 146 to enter and lubricate the bearing 22. The lubricant exits the bearing 22 through a lubricant output 154. The lubricant outlet 154 is connected to the return line 118C.

Any leakage of lubricant from the space 150 between the first end 32 of the rotor shaft 20 and the first end 50 of the disconnect shaft 30 is collected by a collection means, for example a drip tray (not shown), that forms a lubricant output 156. The lubricant output 156 is connected to the return feedline 118B.

On the radially outer surface of the shaft wall 140 is a second first seal 66. In FIG. 9 the second first seal 66 is shown as being located in a circumferential groove defined by a circumferential rib 158. In other non-illustrated embodiments the circumferential rib 158 is not present and the circumferential groove is in the outer surface 62 of the disconnect shaft 30.

The second first seal 66 is axially located on the outer surface 62 of the disconnect shaft 30 in a position that allows a space 160 between the rotor shaft 20 and disconnect shaft 30 to be formed between the circumferential rib 158 and the second end 34 of the rotor shaft 20. The shaft wall 140 defines at least one aperture 162, which is axially located so that each aperture 162 is radially inward of a part of the space 160. Lubricant flowing through the or each aperture 162 enters the space 162. One end of the space 160 is closed by the second first seal 66 and circumferential rib 158. The flow of lubricant out of the or each aperture 162 and into the space 160 is part of a flowpath 164. The flowpath 164 then passes through at least one aperture 166 into bearing 22A which is mounted on the rotor shaft 20 adjacent the second end 34 of the rotor shaft and radially outwards from space 160. The bearing 22A is thus lubricated by the lubricant flowing along the flowpath 164. The lubricant exits the bearing 22A through a lubricant output 168. The lubricant outlet 168 is connected to the return line 118H.

Any leakage of lubricant from the space 160 between the second end 34 of the rotor shaft 20 and the disconnect shaft 30 is collected by a collection means, for example a drip tray (not shown), that forms a lubricant output 170. The lubricant output 170 is connected to the return feedline 118G.

The first and second first seals 64, 66 have the effect that first chamber 60 is kept free of lubricant. This is beneficial because it means the first chamber 60, which typically contains atmospheric gas, stays full of atmospheric gas. As described above, gas is compressible when the disconnect shaft 30 moves axially relative to the rotor shaft 20.

The casing 14 is adapted to support the rotor shaft 20/the armature 18 and the stator 16 in a constant spatial relationship. The casing 14 includes casing elements 172, 174, 176 which are connected to each other to form a second chamber 178 within which the stator 16 is located. The joints between the casing elements 172, 174, 176 are all configured to include first, second and third second seal elements 180, 182, 184 with the result that lubricant introduced into the second chamber 178 will not exit that chamber through the joints between the casing elements 172, 174, 176. The casing element 174 defines a first casing aperture 186 to which the second lubricant input 132 is connected. The lubricant flows along a flowpath 190 through the second chamber 178 and around the armature 18 to a second casing aperture 188. The second casing aperture 188 is connected to a lubricant output 192. The lubricant output 192 is connected to return line 118E.

The above description is meant to be exemplary only, and one skilled in the art will recognize that changes may be made to the embodiments described without departing from the scope of the disclosure. Still other modifications which fall within the scope of the present disclosure will be apparent to those skilled in the art, in light of a review of this disclosure.

Various aspects of the mechanism disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A drive mechanism for use with an electric motor and a clutch mechanism, the drive mechanism comprising:
   a rotor shaft;
   a disconnect shaft, wherein the rotor shaft and disconnect shaft have a longitudinal axis A;
   a disconnect mechanism;
   at least one damper element;
   a part of the clutch; and
   a lubrication system that includes at least one lubricant input, at least one lubricant output, and at least one lubricant pathway;
   wherein:
   the disconnect shaft transmits torque between the rotor shaft and the clutch mechanism;
   the disconnect shaft comprises the part of the clutch and a shaft element;
   the disconnect mechanism is configured to move the disconnect shaft between an engaged position in which the part of the clutch is engaged with the clutch mechanism and a disengaged position in which the part of the clutch is not engaged with the clutch mechanism;
   the at least one damper element is configured to absorb at least part of any kinetic energy introduced into the disconnect shaft as a result of the movement of the disconnect shaft from the engaged position to the disengaged position; and
   the at least one lubricant pathway extends between and permits the flow of lubricant between one of the at least one lubricant inputs and one of the at least one lubricant outputs;
   wherein the disconnect mechanism includes an end shaft which is attached to the end of the disconnect shaft, wherein the end shaft is co-axial with the disconnect shaft,
   the end shaft defines a circumferential disconnect groove which is defined by an actuation face, a groove base, and a passive face, wherein the groove base extends axially between the actuation face and passive face; wherein the actuation face is further from the disconnect shaft than the passive face,
   the disconnect mechanism further includes an actuation shaft, that extends perpendicularly to the disconnect shaft, and which has an actuation end, wherein the actuation shaft has a longitudinal axis and is caused to translate towards the end shaft by an actuator and a biasing element; wherein the biasing element is a spring, wherein the actuation end and disconnect groove are configured such that the actuation end does not extend into the disconnect groove during one mode of operation, defining an inactive position,
   the actuation end and disconnect groove are further configured so that when the actuation shaft is translated out of the inactive position, the actuation end engages the actuation face of the groove and moves the end shaft, and thereby the disconnect shaft, in a direction to disengage mating services of a dog clutch connecting the disconnect shaft to a motor drive shaft, and thereby disconnect the disconnect shaft.

2. The drive mechanism according to claim 1, wherein:
   the rotor shaft comprises an axially extending void;
   the rotor shaft and disconnect shaft are co-axial;
   the disconnect shaft is at least partially positioned within the void;
   the movement of the disconnect shaft between the engaged position and disengaged position is in an axial direction;
   the rotor shaft and disconnect shaft are so configured that torque may be transmitted between the rotor shaft and disconnect shaft;
   the configuration allows transmission of torque throughout the axial movement of the disconnect shaft;
   the disconnect shaft defines a longitudinally extending lubricant conduit; and
   one end of the lubricant conduit defines a lubricant input and the at least one lubricant pathway comprises the lubricant conduit.

3. The drive mechanism according to claim 2, wherein:
   one of the rotor shaft and the disconnect shaft comprises one or more male splines;
   another of the rotor shaft and the disconnect shaft comprises one or female splines;
   the male and female splines are configured to mesh with each other;
   the torque may be transmitted between the rotor shaft and disconnect shaft through the male and female splines; and
   the male and female splines are in at least one lubricant pathway.

4. The drive mechanism according to claim 2, wherein:
   the drive mechanism further comprises a first chamber;
   the first chamber is defined by the rotor shaft, the disconnect shaft, and one or more one first seal elements;
   each first seal element extends between the rotor shaft and disconnect shaft;
   each first seal element makes a fluid tight seal between the rotor shaft and disconnect shaft; and
   the first chamber forms no part of any lubricant pathway.

5. The drive mechanism according to claim 4, wherein:
   there are two seal elements including the first seal element, the two seal elements are axially spaced from each other, and the first chamber is axially between the two seal elements;
   the first chamber has an axial first end and an axial second end;
   the axial first end is further from the clutch mechanism than the axial second end;
   each axial end of the first chamber is at least partially formed by one of the two seal elements; and
   the cross-sectional area of the axially extending void adjacent the one of the two seal elements of the first end is smaller than the cross-sectional area of the axially extending void adjacent the one of the two seal elements of the second end or the rotor shaft and disconnect shaft are so configured that movement of the disconnect shaft between the engaged position and disengaged position causes the volume of the first chamber to decrease.

6. The drive mechanism according to claim 1, wherein the at least one lubricant pathway comprises one lubricant input and two or more lubricant outputs.

7. The drive mechanism according to claim 1, wherein the drive mechanism further comprises a biasing means, and the biasing means is configured to bias the disconnect shaft toward the engaged position;

the biasing means is located within the axially extending void, and the biasing means extends between the rotor shaft and the disconnect shaft.

8. The drive mechanism according to claim 4, wherein the at least one damper element comprises one or more of the first chamber, each first seal element, and biasing means.

9. The drive mechanism according to claim 1, wherein:
the clutch mechanism includes the dog clutch, the dog clutch comprises first and second rotating components that interlock to couple with each other; and
the part of a clutch is one of the first and second rotating components, and the first and second rotating components are in the at least one lubricant pathway.

10. The drive mechanism according to claim 1, wherein the lubrication system functions as a cooling system.

11. An electric motor comprising:
a casing;
a stator;
an armature; and
the drive mechanism claim 1;
wherein the stator is fixed to the casing, and the armature is fixed to the rotor shaft.

12. The electric motor according to claim 11, wherein the stator is in one or more of the at least one lubricant pathway.

13. The electric motor according to claim 11, wherein the lubrication system further functions as a cooling system.

14. The aircraft propulsion system comprising:
an electric motor according to claim 10;
an internal combustion engine; a gearbox;
a propeller drive shaft; and
a propeller;
wherein the electric motor and internal combustion engine both supply torque to the gearbox.

* * * * *